(12) United States Patent
Bruzzese et al.

(10) Patent No.: US 9,720,790 B2
(45) Date of Patent: Aug. 1, 2017

(54) DEVICES AND METHODOLOGIES FOR IMPLEMENTING REDUNDANT BACKUPS IN NVRAM RELIANT ENVIRONMENTS

(71) Applicant: Ainsworth Game Technology Limited, Newington (AU)

(72) Inventors: Vincent Carmelo Bruzzese, Oatlands (AU); Baheerathan Gnanasundram, Wentworthville (AU); Patrick Tan, Wentworthville (AU); Bronislav Paykin, Mentone (AU); Lee Weekes, Sydney (AU); Tony Mulia, Sydney (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 101 days.

(21) Appl. No.: 14/656,223

(22) Filed: Mar. 12, 2015

(65) Prior Publication Data

US 2015/0261628 A1  Sep. 17, 2015

(30) Foreign Application Priority Data

Mar. 12, 2014  (AU) .............................. 2014900833

(51) Int. Cl.
*G06F 11/20*  (2006.01)
(52) U.S. Cl.
CPC ...... *G06F 11/2097* (2013.01); *G06F 11/2038* (2013.01); *G06F 11/2056* (2013.01); *G06F 11/2048* (2013.01)

(58) Field of Classification Search
CPC ............. G06F 11/2038; G06F 11/2097; G06F 11/2056
See application file for complete search history.

(56) References Cited

U.S. PATENT DOCUMENTS 6,035,415 A * 3/2000 Fleming .............. G06F 11/2023
714/11
7,752,173 B1 * 7/2010 Gole ................... G06F 11/2097
707/654

(Continued)

*Primary Examiner* — Yolanda L Wilson
(74) *Attorney, Agent, or Firm* — Cook Alex Ltd.

(57) ABSTRACT

Technology described herein includes an arrangement whereby a hardware-based solution is implemented to enable mirroring of NVRAM data in a master server directly to NVRAM in a sleeper server. Both the master server and sleeper server implement a like motherboard unit, which is configured to implement the mirroring technology. That is, the roles of master and sleeper may be reversed. The master server includes a hardware module that monitors (but does not affect) NVRAM operations at the master server, and replicates those operations via a high speed communications link, such as a fiber optic link, to the sleeper server. The term "high speed communications link" refers to a link with at least 2.5 gigabit speed, and preferably at least 5 gigabit speed. The sleeper server is configured to, when in sleeper mode, suspend control of its own NVRAM module. Instead, the NVRAM module is controlled by a module that is configured to receive NVRAM operations via the fiber optic link, and apply those operations. In this manner, there is a direct mirroring of all master NVRAM content affected in the master's NVRAM to the sleeper's NVRAM. Using technology described herein, this is affected at an "atomic" (e.g. NVRAM bus cycle) level.

10 Claims, 4 Drawing Sheets

(56) References Cited

U.S. PATENT DOCUMENTS

| | | | |
|---|---|---|---|
| 2005/0050392 A1* | 3/2005 | Baba | G06F 11/2023 714/25 |
| 2005/0204183 A1* | 9/2005 | Saika | G06F 11/2025 714/4.11 |
| 2006/0179147 A1* | 8/2006 | Tran | G06F 11/2012 709/227 |
| 2007/0220301 A1* | 9/2007 | Brundridge | G06F 11/2028 714/4.1 |
| 2007/0235933 A1* | 10/2007 | Cowan | G07F 17/3244 273/269 |
| 2007/0244937 A1* | 10/2007 | Flynn, Jr. | G06F 11/1662 |
| 2009/0125968 A1* | 5/2009 | Perlman | A63F 13/12 725/133 |
| 2009/0181775 A1* | 7/2009 | Nilsson | G06F 11/1482 463/42 |
| 2012/0289341 A1* | 11/2012 | Moshal | G07F 17/3293 463/42 |
| 2013/0123019 A1* | 5/2013 | Sullivan | A63F 13/12 463/42 |
| 2013/0212205 A1* | 8/2013 | Flockhart | H04L 69/40 709/208 |
| 2014/0047263 A1* | 2/2014 | Coatney | G06F 11/2023 714/4.11 |

* cited by examiner

Figure 5

DEVICES AND METHODOLOGIES FOR IMPLEMENTING REDUNDANT BACKUPS IN NVRAM RELIANT ENVIRONMENTS

FIELD

The invention relates, in some embodiments, to devices and methodologies for implementing redundant backups in NVRAM reliant environments. The invention has been developed primarily for use with electronic gaming machines and will be described hereinafter by reference to this application. However, it will be appreciated that the technology is applicable in other environments where there is a desire to maintain a high-accuracy redundant backup of NVRAM.

BACKGROUND

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

It is common to maintain redundant backup servers in a wide range of situations. The general premise is that one server acts as a master, and its data is mirrored to a redundant backup server. This is typically achieved using a mirroring protocol implemented via Ethernet or the like, and a primary focus is to ensure that hard disk data and/or flash memory data are kept up to date in the redundant backup. This means that, in the event that the master fails, there is minimal loss of data.

There are limitations in known approaches, stemming for example from delays that occur during the identification, transmission, and slave-side processing of data relevant to the mirroring process. Whilst these may seem minor (for example at the millisecond level, or perhaps a few seconds), they can be significant in some contexts. An example of such a context is gaming, for example where a server provides a link controller functionality for the purpose of awarding jackpots (which may be significant) to gaming machines.

SUMMARY

One embodiment provides a method for operating a computing device having a primary microprocessor coupled to a local NVRAM module and an Ethernet module, the method including:

performing a determination provides to determine whether to adopt a master role or a sleeper role;

in the case that the computing device adopts the master role:
(i) monitoring NVRAM operations; and
(ii) replicating NVRAM operations via a high speed communications link to a second computing device, such that the second computing device implements the replicated NVRAM operations in its local NVRAM;

in the case that the computing device adopts the master role:
(i) operating in a sleeper mode in which Ethernet functionality is disabled and the computing device's primary microprocessor does not access the local NVRAM module;
(ii) receiving, from a second computing device via a high speed communications link, data that replicates NVRAM operations at the second computing device, and applying those NVRAM operations in the local NVRAM module; and
(iii) in the event that a failover event is observed, activating the Ethernet functionality and enabling the computing device's primary microprocessor to access the local NVRAM module, and adopting the master role.

One embodiment provides a gaming system comprising an array of gaming machines are adapted to be electrically connected to at least a first gaming server and a second gaming server by network protocol; wherein the first gaming server and the second gaming server are mirrored across a network protocol; wherein the second gaming server operates as a full redundancy backup copy of the first gaming server.

One embodiment provides a gaming system comprising a first array of gaming machines are adapted to be electrically connected to a second array of gaming servers by network protocol; wherein the gaming servers within the second array are adapted to allow for individual blocks of data to be redundantly and simultaneously copied to and stored on at least two gaming servers within the second array across a network protocol; wherein all data stored within the second array is redundantly copied to at least two gaming servers within the second array.

One embodiment provides a computer program product for performing a method as described herein.

One embodiment provides a non-transitive carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality.

That is, an "exemplary embodiment" is an embodiment provided as an example, as opposed to necessarily being an embodiment of exemplary quality.

BRIEF DESCRIPTION OF THE DRAWINGS

Preferred embodiments of the invention will now be described, by way of example only, with reference to the accompanying drawings in which.

DETAILED DESCRIPTION

The invention relates, in some embodiments, to devices and methodologies for implementing redundant backups in NVRAM reliant environments. The invention has been developed primarily for use with electronic gaming machines and will be described hereinafter by reference to this application. However, it will be appreciated that the technology is applicable in other environments where there is a desire to maintain a high-accuracy redundant backup of NVRAM.

Overview

In overview, some embodiments provide an arrangement whereby a hardware-based solution is implemented to enable mirroring of NVRAM data in a master server directly to NVRAM in a sleeper server. Both the master server and sleeper server implement a like motherboard unit, which is configured to implement the mirroring technology. That is, the roles of master and sleeper may be reversed. The master server includes a hardware module that monitors (but does not affect) NVRAM operations at the master server, and replicates those operations via a high speed communications link, such as a fiber optic link, to the sleeper server. The term "high speed communications link" refers to a link with at least 2.5 gigabit speed, and preferably at least 5 gigabit speed. The sleeper server is configured to, when in sleeper mode, suspend control of its own NVRAM module. Instead, the NVRAM module is controlled by a module that is configured to receive NVRAM operations via the fiber optic link, and apply those operations. In this manner, there is a direct mirroring of all master NVRAM content affected in the master's NVRAM to the sleeper's NVRAM. Using technology described herein, this is affected at an "atomic" (e.g. NVRAM bus cycle) level.

The master server provides to the sleeper server a heartbeat message, preferably via an in-band bidirectional communications (referred to herein as a back-channel) implemented in the high speed link (which is described as a fiber optic link). In the case that the master server fails, the sleeper server identifies that through the heartbeat message, and automatically takes over as master (at which point it re-assumes conventional control over its own NVRAM module).

In embodiments described below, the master server communicates with (and monitors) a plurality of devices via Ethernet. In the described examples, these are electronic gaming machines. The sleeper server, when in sleeper mode, deactivates its Ethernet. The Ethernet is enabled when taking over as master. In a preferred embodiment, both the master and sleeper implement corresponding network identities (for example IP address and MAC address). In this manner, when the sleeper takes over during failover, that is substantially transparent to connected devices, which continue to operate in the same manner as before failover. It will be appreciated that, on the basis that the sleeper has its Ethernet deactivated whilst in sleeper mode (i.e. when the master is operational) the corresponding network identities do not result in conflicts.

Context

Figure 1:
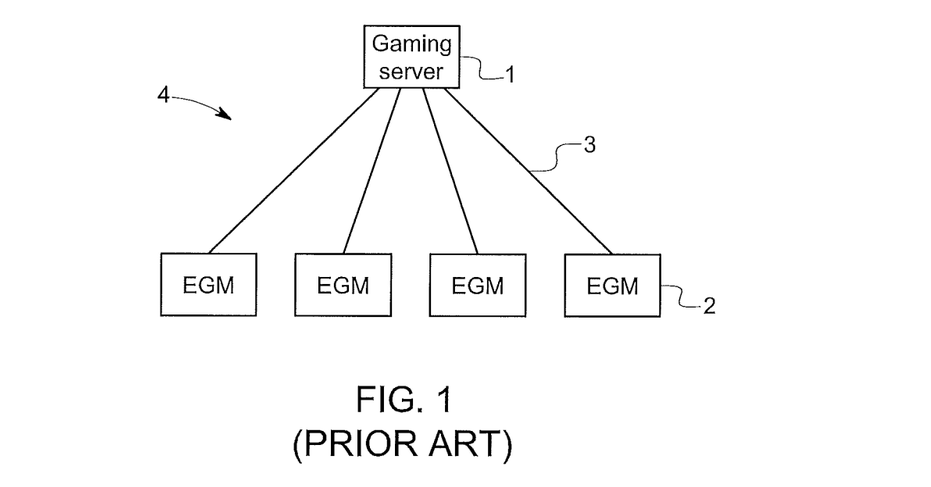
FIG. 1 is a schematic block diagram of an example of the prior art system configurations used with electronic gaming systems.

FIG. 1 shows an example of a prior art system for use with electronic gaming machines. The gaming system 4 is shown and generally comprises: an array of electronic gaming machines 2; network connections 3; and a gaming server 1. The array may include any number of electronic gaming machines 4. The electronic gaming machines may preferably be slot machines or poker machines.

The slot machines or poker machines generally include electronic gambling games wherein players may bet or wager money or credits based on the predetermined and predefined winning combinations of symbols being shown on the screen.

Typically, the symbols are defined as appearing in reel animations and are randomly displayed. Wherein the shown symbols matches a predefined winning combination or set as shown on a paytable associated with the game, the player is awarded a prize. The prize is typically determined by the difficulty or likelihood of the particular winning combination being shown. Hence, unlikely winning combinations are generally awarded relatively larger prizes than other more likely winning combinations of symbols.

Preferably, the gaming machines 4 include at least 3 reels of symbols which are spun when a player selects a bet or wager. The prize, if any, is awarded once the reels stop spinning and the symbols match the predetermined winning combinations.

The network connections 3 can be made by any standardised network protocol or system including WiFi, Bluetooth™, or Ethernet connection. The system may also include a switch or router (not shown) which facilitates communications between the electronic gaming machines and the gaming server.

The gaming server 1 is configured to manage the electronic gaming machines 2 and is adapted to allow an operator acting on behalf of the gaming venue, casino, or gaming machine venue, to review statistics about each individual gaming machine and the progress of each player located at each gaming machine.

The gaming server 1 may also allow for the amending or updating of gaming parameters to the electronic gaming machines (such as the likelihood of payouts or prizes etc). Additionally, the gaming server 1 may manage the communication between the gaming machines to allow or facilitate progressive jackpots operated cooperatively between at least two gaming machines. The progressive jackpot totals may be shown on a separate monitor or screen (not shown) which may be connected to either the network connections or directly to the gaming server.

The gaming server 1 may also allow or facilitate the remote administration or upgrade of software to the electronic gaming machines. Upgrades may be installed on the gaming server from internet or directly through loading some form of portable media. The upgrades may then be distributed and installed on the electronic gaming machines via the network connections.

The prior art example shown in FIG. 1 does not include any form of backup or backup system wherein if the gaming server failed, the entire gaming system would effectively cease. Typically, previous backup redundancy systems require manual intervention before the backup can take over from the master which has broken down. With this kind of system there will be down time for the gaming venue and result in loss of revenue and confidence in the gaming venue. The present embodiments aim address this problem so that there is no or little effective system down time and the hand over from master to backup gaming server will be immediate and seamless without any need for manual intervention. Gaming venues benefit from this type of improved system by possibly reducing labour costs associated with fixing the system and losses caused by the system being non-functional.

Any down time may be a disaster for a gaming venue running a gaming server especially one which has the potential to bring down the entire floor of a casino therefore it is critical that we avoid having any down time when running our gaming server. With our backup redundancy approach there will be no down time when running our gaming server giving customers confidence and peace of mind when running our gaming server.

First Exemplary Embodiment

Figure 2:
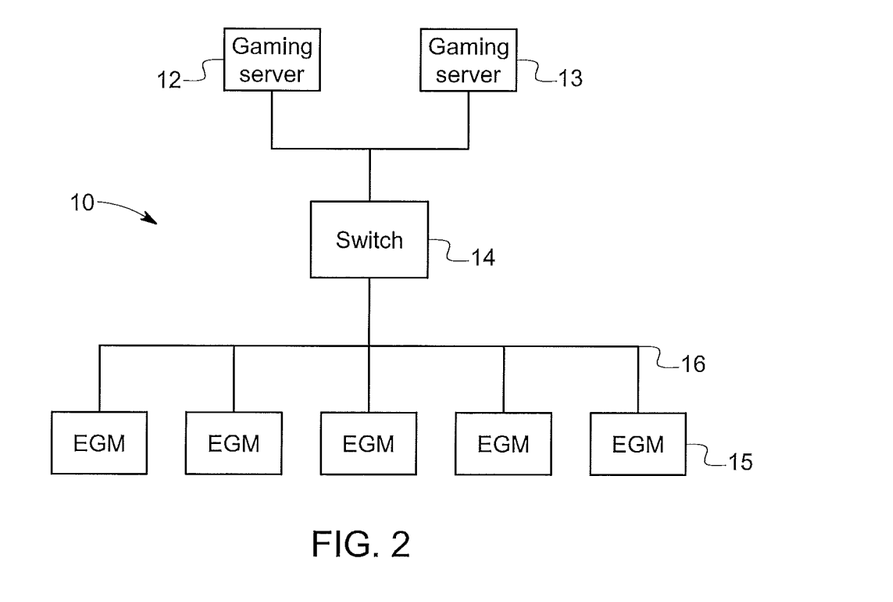
FIG. 2 is a schematic block diagram of a first preferred embodiment of the present invention.

FIG. 2 depicts a first preferred embodiment of the present invention, wherein the system 10 includes: at least two gaming servers. In this embodiment, a first gaming server 12 and a second gaming server 13 are provided and both connected to a switch or router 14.

Network connections 16 are used to electrically connect the electronic gaming machines 15 to the first and second servers 12 & 13 in a similar manner to that depicted in FIG. 1.

However, in this first preferred embodiment, the first and second gaming servers are mirrored copies of each other. The mirroring of the servers may be achieved asynchronously or synchronously. However, synchronise data transfer is preferred. Typically, the gaming servers may be a short physical distance apart to aid in networking reliability.

In addition to providing an additional copy of the data for the purpose of redundancy in case of hardware failure, server mirroring can allow each server to be accessed separately for reading purposes. Under certain circumstances, this can significantly improve performance as the system can choose for each read which server can seek most quickly to the required data. This is especially significant where there are several tasks competing for data on the same server, and thrashing (where the switching between tasks takes up more time than the task itself) can be reduced. This is an important consideration in hardware configurations that frequently access the data on the server.

In some implementations, the mirrored server can be split off and used for data backup, allowing the first gaming server to remain active. However merging the two servers then may require a synchronization period if any write I/O activity has occurred to the mirrored server.

The mirroring of data across the gaming servers may be achieved by using various mirroring methodologies. The following examples of mirroring methodologies have been disclosed as possible processes to use, however other mirroring methodologies may also be used.

A first mirror methodology comprises mirroring (without parity or striping). Data is written identically to two (or more) drives, thereby producing a "mirrored set". The read request is serviced by any of the drives containing the requested data. This can improve performance if data is read from the disk with the least seek latency and rotational latency. Conversely, write performance can be degraded because all drives must be updated; thus the write performance is determined by the slowest drive. The array continues to operate as long as at least one drive is functioning.

A second mirroring methodology comprises block-level striping with distributed parity. Unlike in the fourth mirroring methodology, parity information is distributed among the drives. It requires that all drives but one be present to operate. Upon failure of a single drive, subsequent reads can be calculated from the distributed parity such that no data is lost. The second mirroring methodology requires at least three servers.

A third mirroring methodology comprises block-level striping with double distributed parity. Double parity provides fault tolerance up to two failed drives. This makes larger groups of servers more practical, especially for high-availability systems, as large-capacity storage devices take longer to restore. As with the second mirroring methodology, a single server failure results in reduced performance of the entire array until the failed server has been replaced.

A fourth mirroring methodology comprises block-level striping with dedicated parity.

Preferably, the mirrored gaming servers allow for redundant storage of data either by way of hard drives, storage media, or memory. Preferably, the gaming servers may include and use NVRAM for the storage device.

Non-volatile memory, nonvolatile memory, NVM or non-volatile storage is computer memory that can get back stored information even when not powered. Examples of non-volatile memory include read-only memory, flash memory, ferroelectric RAM (F-RAM), most types of magnetic computer storage devices (e.g. hard disks, floppy disks, and magnetic tape), optical discs, and early computer storage methods such as paper tape and punched cards.

Non-volatile memory is typically used for the task of secondary storage, or long-term persistent storage. The most widely used form of primary storage today is a volatile form of random access memory (RAM), meaning that when the computer is shut down, anything contained in RAM is lost. Unfortunately, most forms of non-volatile memory have limitations that make them unsuitable for use as primary storage. Typically, non-volatile memory either costs more or has a poorer performance than volatile random access memory.

In terms of the nature of NVRAM that is implemented in embodiments of the technology disclosed herein, several companies are working on developing non-volatile memory systems comparable in speed and capacity to volatile RAM. For example, IBM is currently developing MRAM (Magnetoresistive RAM). Not only would such technology save energy, but it would allow for computers that could be turned on and off almost instantly, bypassing the slow start-up and shutdown sequence. In addition, Ramtron International has developed, produced, and licensed ferroelectric RAM (F-RAM), a technology that offers distinct properties from other nonvolatile memory options, including extremely high endurance (exceeding $10^{16}$ for 3.3 V devices), ultra-low power consumption (since F-RAM does not require a charge pump like other non-volatile memories), single-cycle write speeds, and gamma radiation tolerance. Other companies that have licensed and produced F-RAM technology include Texas Instruments, Rohm, and Fujitsu.

Non-volatile data storage can be categorized in electrically addressed systems (read-only memory) and mechanically addressed systems (hard disks, optical disc, magnetic tape, holographic memory, and such). Electrically addressed systems are expensive, but fast, whereas mechanically addressed systems have a low price per bit, but are slow. Non-volatile memory may one day eliminate the need for comparatively slow forms of secondary storage systems, which include hard disks.

In this first embodiment, the gaming servers may include more than two servers which may additionally increase the speed and the redundancy in the system. The redundancy of the mirroring methodology prevents or limits the capacity of data loss due to hardware failure of the gaming server.

Figure 3:
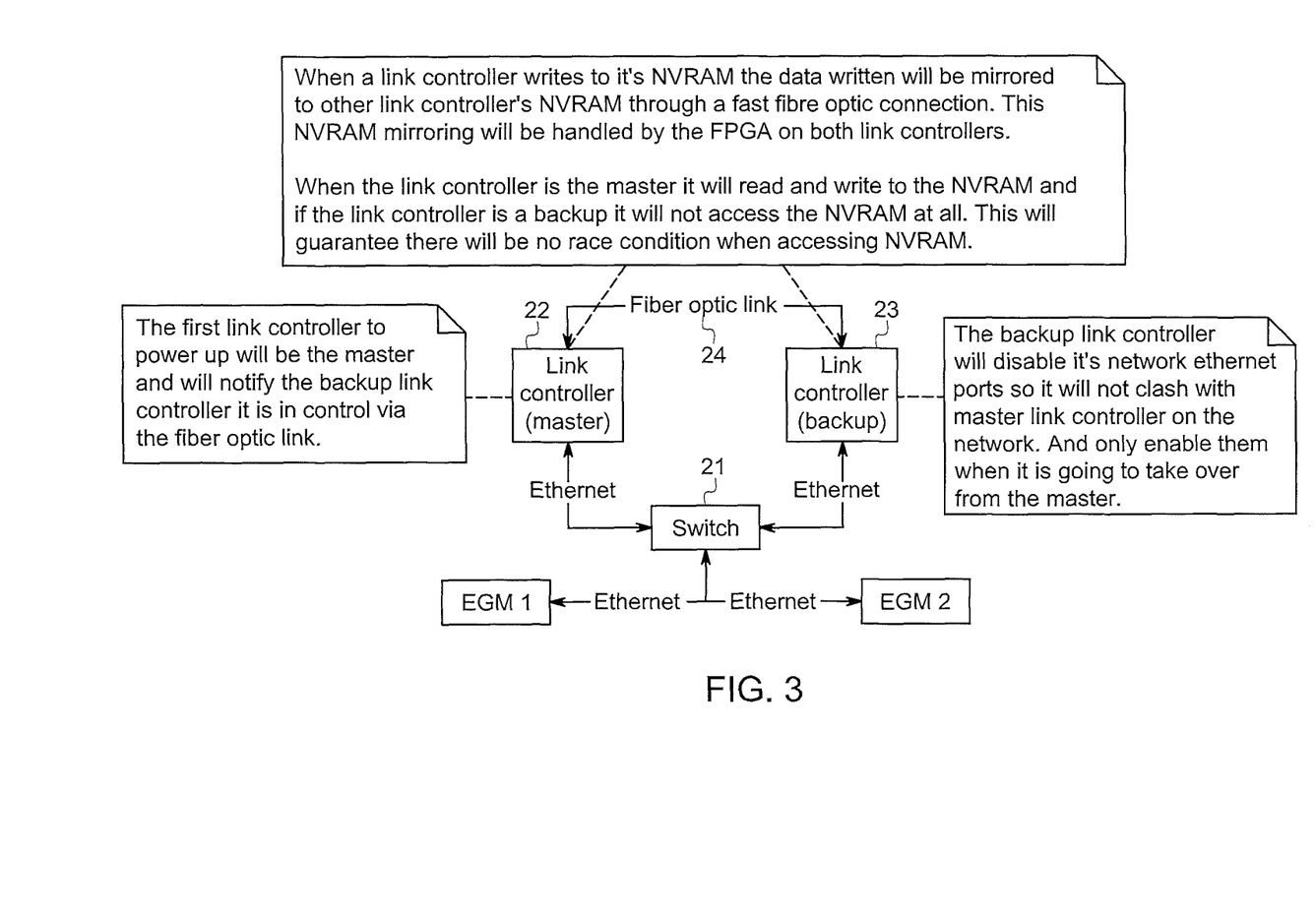
FIG. 3 is a more detailed view of the first preferred embodiment.

FIG. 3 depicts a further diagram demonstrating the system forming part of the first embodiment of the present invention. In this diagram, the gaming server (also called Link Controllers) are working in tandem to produce the same mirroring effect as earlier described in relation to the FIG. 2. In this Figure, the First Gaming Server has been alternatively named Master Link Controller; and the Second Gaming Server has been alternatively named Link Controller (backup) or Slave Link Controller.

As an improvement to the overall system, FIG. 3 includes a switch 21 which may replace the switch 14 of FIG. 2. The slave or backup gaming server may selectively have its ports blocked by the managed switch 14 to prevent the send and receiving of packets of information from the network connections. Preferably, the link controller (backup) 23 may determine this from instructions sent by a human operator. The human operator may at any time switch the gaming servers from master to slave or slave to master. Preferably, the switch 14 may be operated and activated using a menu based interface that may operate through a web browser or similar technology.

The mirroring between the Link Controller (Master) 22 and Link Controller (backup) 23 is accomplished through a link 24. Preferably, the link 24 is a fibre optic or high speed link between the gaming servers which allows for high speed data replication and backup.

The switch 14 may be additionally connected to further switches or routers which may in turn be connected to further electronic gaming machines (not shown in FIG. 3); or directly to electronic gaming machines shown as EGM1 and EGM2. Preferably, all of the switches are connected by Ethernet connection but other forms of network connection or protocol may be used.

Further, the Master Gaming Server may send a carrier signal or "heart beat" signal to the managed switch 14. The managed switch 14 may automatically switch the master and slave gaming server, wherein the heart beat signal has failed to be detected by the managed switch at a regular time interval.

In this specification, the first and second gaming servers or master and slave gaming server may be collectively referred to as an array of gaming servers. This array of gaming servers may include any number of gaming servers.

Second Exemplary Embodiment

A second exemplary embodiment is now described by reference to FIG. 4, which illustrates a technological framework, and FIG. 5, which illustrates a computer implemented method that is executed by certain hardware components shown in FIG. 4.

Figure 4:
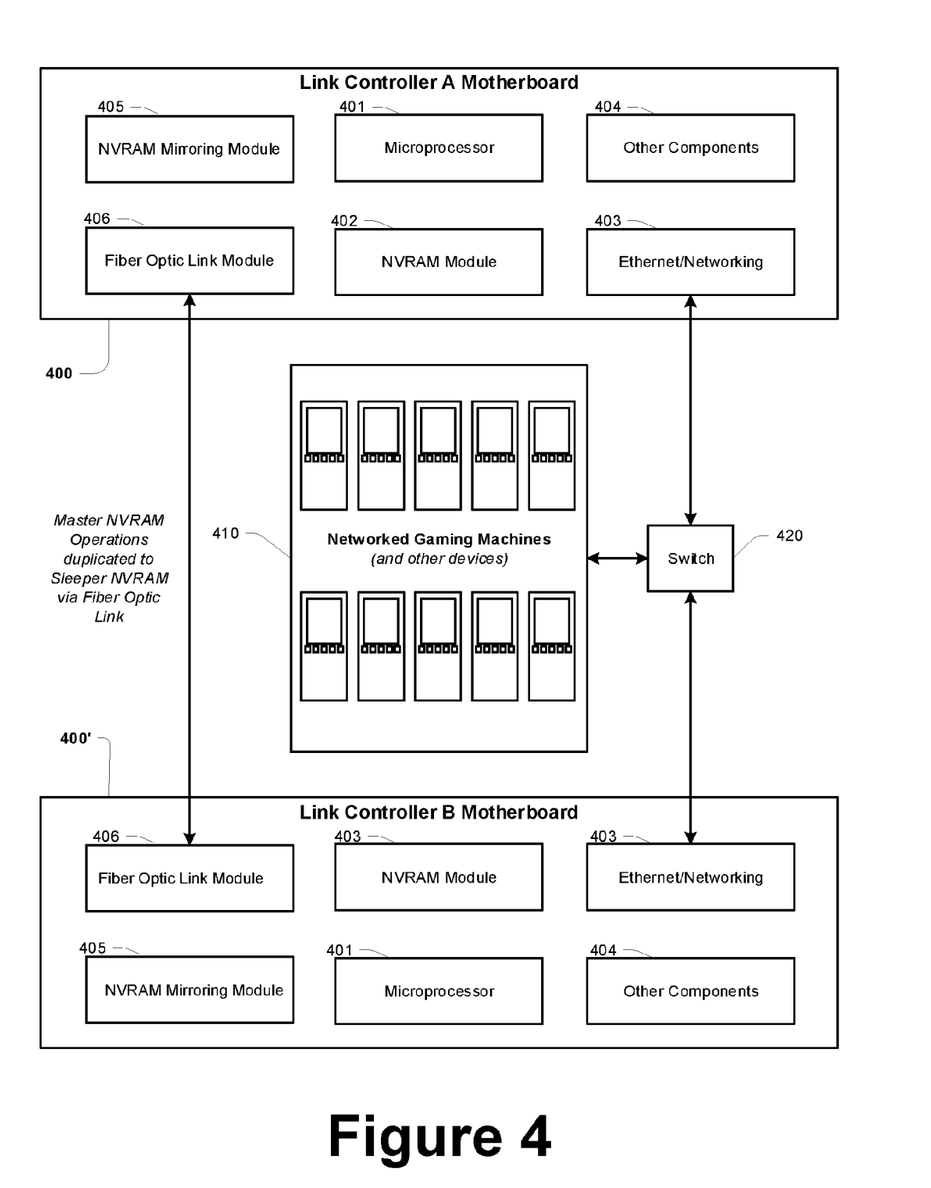
FIG. 4 illustrates a backup arrangement according to one embodiment.

The embodiment of FIG. 4 is directed to an arrangement where a link controller, Link Controller A, operates with a plurality of networked electronic gaming machines 410 via a switch 420. Although this example has been illustrated in the context of link controllers and electronic gaming machines, it will be appreciated that the technology may be applied in other situations. In particular, the technology is of specific relevance to any technological environments where there is a desire to implement a redundant server arrangement that replicates master server NVRAM in a highly efficient and accurate manner.

Link Controller A has a motherboard 400, which is functionally illustrated in a simplified manner. FIG. 4 also illustrates a second link controller, Link Controller B, which has a motherboard 400'. Motherboard 400 and motherboard 400' are substantially identical (i.e. they include various corresponding components which enable them to function in a similar and complementary manner).

Each link controller motherboard includes conventional components: a microprocessor 401, a NVRAM module 402, an Ethernet (or other networking module) 403 and other components 404. Each also includes an NVRAM mirroring module 405, which is in some embodiments implemented via a FPGA. This module is configured to implement NVRAM mirroring and redundant failover as described herein. The NVRAM mirroring module 405 of motherboard 400 communicates with the NVRAM mirroring module 405 of motherboard 400' via an optic fiber link (provided by respective fiber optic link modules 406). This provides high speed, high bandwidth communications. For example, a fiber optic link of bandwidth in the order of 6.25 gigabit is preferred.

NVRAM mirroring module 405 is configured to, when operating in a "master" mode, passively monitor NVRAM operations, particularly NVRAM write operations initiated by microprocessor 401. This is "passive" monitoring in the sense that module 405 does not have any influence or effect on the interaction between processor 401 and NVRAM module 402. For example, in some embodiments a NVRAM operation is defined by a 128 bit packet, which includes (for instance) 24 address bits, 64 data bits, and other information (for example including a checksum and the like). NVRAM mirroring module 405 is configured to read and replicate the lines of code via fiber optic link module. The replicated lines of code are received by the fiber optic link module 405 of motherboard 400', and via the respective module 406 applied directly to the local NVRAM module 403. In this manner, as all operations applied to the NVRAM module on motherboard 400 are correspondingly applied to the NVRAM module 403 of motherboard 400', both NVRAM modules contain identical data. As the modules 406 are implemented in FGPA hardware, and as the fiber optic link is high speed and direct, this mirroring occurs with extremely little delay (for example a power interrupt or the like would unlikely result in any data loss).

Figure 5:
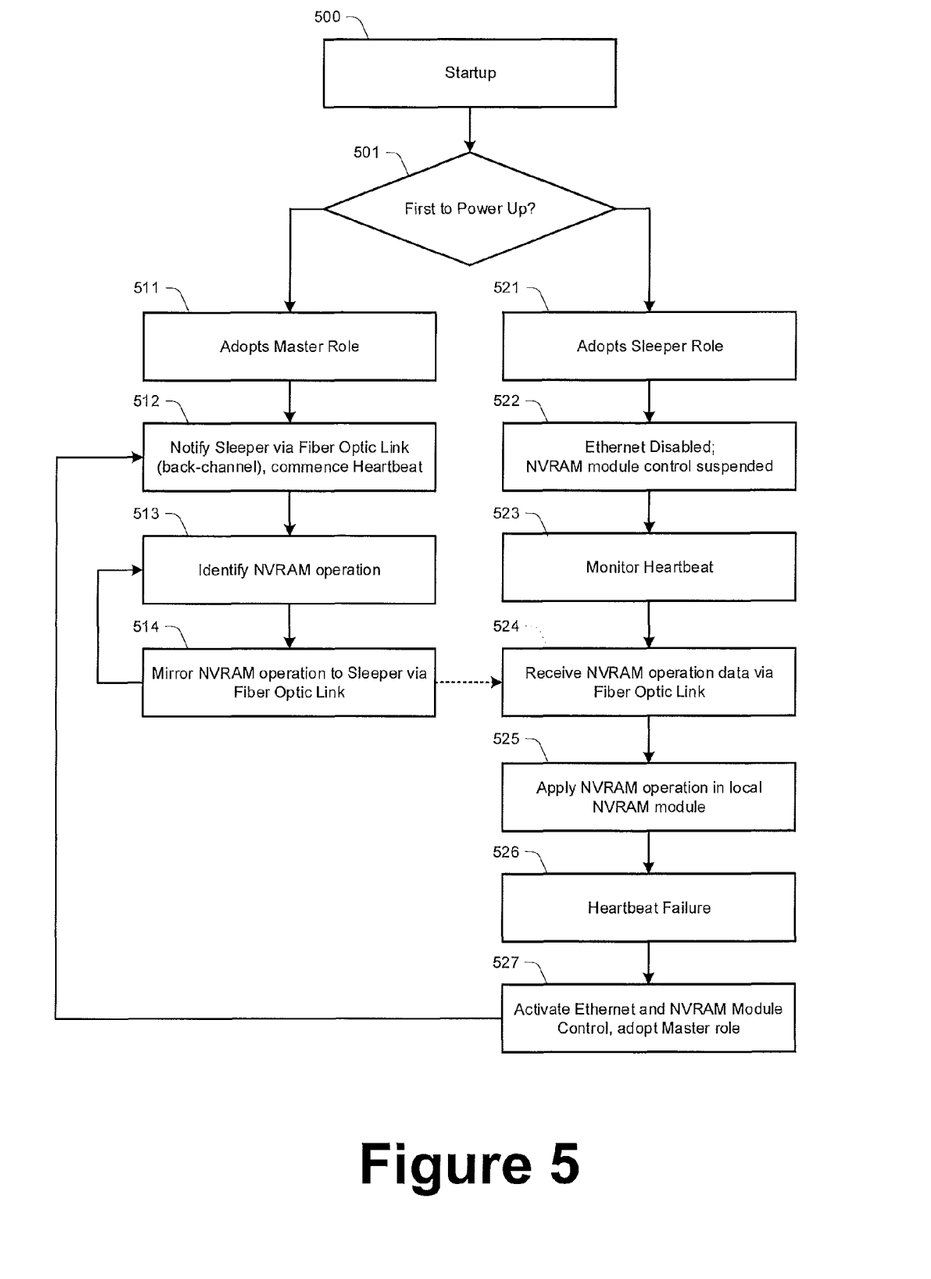
FIG. 5 illustrates a method according to one embodiment.

Logic encoded in module 406 (or alternately stored elsewhere in the motherboard or link controller) causes Link Controller A or Link Controller B to perform the method shown in FIG. 5. It will be appreciated that other embodiments implement variations of this method. The method is described by reference to Link Controller A.

Functional block 500 represents a process including device start-up. At decision 501, module 406 determines whether it is first to power up. For example, if it is second to power up, it will have received (or will be receiving) communications from Link Controller B via the optic fiber link.

In the event that Link Controller A is first to power up, it adopts a master role as indicated by functional block 511. It then, at 512 via a back-channel communication over the optic fiber link, informs Link Controller B that it is master, and commences provision of a heartbeat message (which is used to show Link Controller A is operational, and in some embodiments for synchronisation and other functions). It will be appreciated that a sleeper is not always present.

Functional blocks 513 and 514 represent a process whereby module 406 identifies NVRAM operations (513) and mirrors those operations via the fiber optic link to Link Controller B thereby to directly affect the same change in Link Controller B's NVRAM module as is affected in Link Controller A's NVRAM module. These processes continue to loop so long as Link Controller A remains operational.

In the case that Link Controller A determines that it is not first to power up, it receives data from Link Controller B via back-channel communications over the fiber optic link, and adopts a sleeper role at 521. This includes, as shown by functional block 522:
(i) Operating with Ethernet disabled. This may include either actively disabling Ethernet, or refraining from enabling Ethernet from the outset. This prevents clashes with the master link controller on the network (and allows an implementation whereby both link controllers implement the same network attributes, such as IP address and MAC address).
(ii) Operating with NVRAM module control suspended. This may include either actively disabling NVRAM access by the local microprocessor, or refraining from enabling such access from the outset. This ensures that there is no race condition when accessing NVRAM; uninhibited access is provided to the mirroring behaviour.

As shown by functional block 523, Link Controller A monitors the heartbeat of Link Controller B. Whilst this heartbeat is received, messages received via the fiber optic link from the NVRAM mirroring module of Link Controller B are applied to the NVRAM module of link controller B, thereby to replicate NVRAM operations of Link Controller A.

Functional block 526 represents a process whereby a heartbeat failure is identified (or other failover condition satisfied). In response, functional block 527 represents a process whereby Link Controller A activates its Ethernet and NVRAM module control, and takes over the master role.

In a preferred embodiment, Link Controller A and Link Controller B each implement the same network attributes (for example IP address and MAC address). This is not a problem, as the sleeper has its Ethernet disabled. There is, however, a significant practical advantage in the sense that networked devices which communicate with a link controller need not modify their operation at all in spite of a failover event; they continue to address all communications in the same manner.

A further advantage of this arranging is that maintenance (for example software updates and the like) may be applied to a sleeper device without affecting gaming operation, and then a failover intentionally caused such that maintenance can be performed on the previous master without a need to take gaming functionalities off line. The previous master re-joins as sleeper.

CONCLUSIONS AND INTERPRETATION

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for operating a computing device having a primary microprocessor coupled to a local NVRAM module and an Ethernet module, the method including:
   determining whether to adopt a master role or a sleeper role;
   in the case that the computing device adopts the master role:
   (i) monitoring NVRAM operations; and
   (ii) replicating NVRAM operations via a high speed communications link to a second computing device, such that the second computing device implements the replicated NVRAM operations in its local NVRAM;
   in the case that the computing device adopts the sleeper role:
   (i) operating in a sleeper mode in which Ethernet functionality is disabled and the computing device's primary microprocessor does not access the local NVRAM module;
   (ii) receiving, from a second computing device via a high speed communications link, data that replicates NVRAM operations at the second computing device, and applying those NVRAM operations in the local NVRAM module; and
   (iii) in the event that a failover event is observed, activating the Ethernet functionality and enabling the computing device's primary microprocessor to access the local NVRAM module, and adopting the master role.

2. The method according to claim 1 further comprising, in the case that the computing device adopts the master role: (iii) providing a regular heartbeat signal to the second computing device.

3. The method according to claim 1 further comprising, in the case that the computing device adopts the sleeper role: (iv) receiving a regular heartbeat signal from the second computing device; and (v) determining that a failover event is observed in response to predefined conditions defined by reference to the heartbeat signal.

4. The method according to claim 3 wherein the predefined conditions include an absence of the heartbeat signal.

5. The method according to claim 1 wherein the computing device and the second computing device apply corresponding network identity characteristics.

6. The method according to claim 5 wherein the applying corresponding network identity characteristics includes applying identical MAC addresses and identical IP addresses.

7. The method according to claim 1 wherein the computing device includes a NVRAM mirroring module, wherein the NVRAM mirroring module is configured to, in the case that the computing device adopts the master role, facilitate the monitoring of NVRAM operations and replicating of NVRAM operations via the high speed communications link to the second computing device, such that the second computing device implements the replicated NVRAM operations in its local NVRAM.

8. The method according to claim 7 wherein the NVRAM mirroring module defined by a FPGA.

9. The method according to claim 7 wherein the NVRAM mirroring module is configured to, in the case that the computing device adopts the sleeper role, apply NVRAM operations received via the high speed communications link to the local NVRAM module.

10. A device configured to perform a method according to claim 1.

* * * * *